United States Patent
Ball

(10) Patent No.: US 10,836,686 B1
(45) Date of Patent: Nov. 17, 2020

(54) VITAMIN-HORMONE HORTICULTURAL PRODUCT

(71) Applicant: Mitogrow, LLC, Houston, TX (US)

(72) Inventor: John Christopher Ball, Flower Mound, TX (US)

(73) Assignee: Mitogrow, LLC, Houston, TX (US)

( * ) Notice: Subject to any disclaimer, the term of this patent is extended or adjusted under 35 U.S.C. 154(b) by 0 days.

(21) Appl. No.: 16/913,831

(22) Filed: Jun. 26, 2020

Related U.S. Application Data

(60) Provisional application No. 62/867,698, filed on Jun. 27, 2019.

(51) Int. Cl.
| | | |
|---|---|---|
| C05F 11/10 | (2006.01) |
| C05C 11/00 | (2006.01) |
| C05F 11/08 | (2006.01) |
| C05G 5/10 | (2020.01) |

(52) U.S. Cl.
CPC .............. *C05F 11/10* (2013.01); *C05C 11/00* (2013.01); *C05F 11/08* (2013.01); *C05G 5/10* (2020.02); *C07B 2200/13* (2013.01)

(58) Field of Classification Search
CPC . C05F 11/10; C05F 11/08; C05G 5/10; C05C 11/00; C07B 2200/13
See application file for complete search history.

(56) References Cited

U.S. PATENT DOCUMENTS

| | | |
|---|---|---|
| 2003/0008949 A1 | 1/2003 | Devisetty |
| 2003/0062646 A1 | 4/2003 | Schmiedel |
| 2008/0214396 A1 | 9/2008 | Best |
| 2010/0266645 A1 | 10/2010 | Liang |
| 2011/0072872 A1 | 3/2011 | Hartle |
| 2012/0272700 A1 | 11/2012 | Nevin |
| 2013/0125598 A1 | 5/2013 | Bradbury |
| 2013/0237424 A1 | 9/2013 | Funada |
| 2013/0276493 A1* | 10/2013 | Johnson ............. C12N 1/20 71/8 |
| 2014/0249031 A1 | 9/2014 | Mulqueen |
| 2015/0080216 A1 | 3/2015 | Wikeley |
| 2015/0250733 A1 | 9/2015 | Odidi |
| 2015/0351396 A1 | 12/2015 | Hercamp |
| 2016/0060182 A1 | 3/2016 | Cook |
| 2016/0297723 A1 | 10/2016 | Banks |
| 2017/0283335 A1* | 10/2017 | Rainey ............. C05D 3/02 |

FOREIGN PATENT DOCUMENTS

| | | |
|---|---|---|
| CN | 101475420 A | 7/2009 |

OTHER PUBLICATIONS

Graeme, "Kelp Help". Sustainable Agriculture. <https://blog.nutri-tech.com.au/705/> Mar. 27, 2009.*
Tilly's Nest. "Sea Kelp Supplement for Backyard Chickens". <https://www.tillysnest.com/2016/11/sea-kelp-backyard-chickens/> Nov. 21, 2016.*
Sharif, Rahat, et al. "The multifunctional role of chitosan in horticultural crops; a review." Molecules 23.4 (2018): 872.*
SK Reilly,Microbial Pestcides Branch Biopesticides and Pollution Prevention Division (7511P) US Environmental Protection Agency letter dated Mar. 17, 2009, re PGR-IV Granule.

* cited by examiner

*Primary Examiner* — Jennifer A Smith

(74) *Attorney, Agent, or Firm* — Etherton Law Group, LLC

(57) ABSTRACT

A water-suspensible, dry, vitamin-hormone horticultural product for promoting plant root growth comprising a combination of one or more plant growth regulators, mycorrhizae, vitamins B1 and B6, sea kelp and beneficial microbes in a carrier. In one embodiment the product is a dry powder of about 2.00 wt % indole-3-butyric acid in crystalline solid form; about 0.20 wt % thiamine mononitrate (B1) in water-soluble powder form; about 0.20 wt % pyridoxine HCl (B6) in water-soluble powder form; about 2.64 wt % Mycorrhizae in water-soluble powder form; about 1.06 wt % sea kelp extract in brown flake form; about 0.88 wt % *Bacillus amyloliquefaciens* in water-soluble powder form; about 0.07 wt % sodium lauryl sulfoacetate in water-soluble powder form; and about 92.35 wt % maltodextrin in water-soluble powder form.

16 Claims, No Drawings

VITAMIN-HORMONE HORTICULTURAL PRODUCT

CROSS-REFERENCE TO RELATED APPLICATIONS

This application claims the benefit of U.S. Provisional Application No. 62/867,698 filed Jun. 27, 2019.

FIELD OF INVENTION

This invention relates generally to agricultural products. This invention relates particularly to vitamin-hormone horticultural products.

BACKGROUND

A plant's root system is highly responsive to the availability and distribution of nutrients in the soil. Root development is more rigorous when roots are exposed to localized sources of nutrients. This can lead to a foraging response in which lateral roots are stimulated to proliferate specifically in the zone that is rich in nutrients. This behavior also has implications for a plant's ability to compete with the other plants for limited supplies of nutrients. Conversely, root development can decrease or be suppressed in areas that are lacking nutrients or that are high in plant-growth inhibitors.

To reach deeper roots and avoid surface turf, mulch, or ground cover competition for the nutrients, subsurface treatment is the preferred method of applying nutrients to the soil. Traditionally trees and other deep root plants are treated by injecting a liquid suspension or solution of nutrients into the soil around the plant. The injection system requires a pump to produce the liquid pressure necessary for injection of the suspension or solution into the soil. To protect the pump from damage, a screen or filter is placed in line between the feed (mix) tank and the pump inlet. Unfortunately, however, the screen also prevents particles that are larger than the screen mesh from being ejected from the tube. Consequently, it would be advantageous for nutrients to be provided in a liquid suspension or solution that can pass through the screen without clogging it.

SUMMARY OF THE INVENTION

This product is a water-suspensible, dry powder comprising a combination of plant growth regulators, mycorrhizae, vitamins B1 and B6, sea kelp and beneficial microbes in a carrier. The product promotes root growth and development in most species of trees, shrubs, and grasses. It is particularly valuable for deep root tree feeding, drenching, irrigation, chemigation, transplanting, hydroseeding and hydromulching.

Use of this product encourages and improves overall nutrient and water uptake, thereby enhancing vigor and growth as well as tolerance to environmental stress. Because this product does not contain macronutrients, preferably a regular fertilizing program is also applied to the treated plants.

DETAILED DESCRIPTION OF THE INVENTION

This product is a water-suspensible, dry powder comprising a combination of at least one or more plant growth regulators, mycorrhizae, vitamins B1 and B6, sea kelp and beneficial microbes in a carrier.

Laboratory testing indicates that the use of this product can significantly reduce the titer of Candidatus liberibacter in both citrus and potato root tissue indicting that it may useful in combating Huanlongbing, aka citrus Greening, in a variety of citrus crops.

As used herein, a plant growth regulator is an organic compound, either natural or synthetic, that modifies, controls, accelerates, or retards the rate of growth or maturation of a plant. Plant growth regulators include phytohormones such as gibberellins, cytokinins, abscisic acid, brassinosteroids, strigolactones, and auxins. Auxins include indole-3-butyric acid ("IBA") and indole-3-acetic acid ("IAA"). Because the auxin acids are water-insoluble, the auxin is provided in small particles along with a surfactant to thus be suspensible. Alternatively or in addition, the salt of the auxin may be used. Auxins in the natural acid form have a longer shelf life than the salt form. Plant growth regulators may have positive as well as inhibitory functions, depending primarily on the applied dosage. Preferably IBA or the salt thereof is the plant growth regulator, however other forms or other plant regulators may be used. Potentially the IBA could range from 0.5 wt % to 10 wt %, if the potassium salt of IBA was used. The plant growth regulators are supplied in water-soluble or water-suspensible form, preferably crystalline solid.

The mycorrhizae include endomycorrhizae and ectomycorrhizae fungi spores. Research has shown that diversity of mycorrhizae in the plant's root system is important, as these different species of mycorrhizae provide different benefits to the plant under variable circumstances. For instance, some species are better at assisting in nutrient uptake, while others are more proficient in assisting the plant with water efficiency, and others are responsible for mitigating toxins and salts from reaching the plant's vascular system. Research has also shown that different species of mycorrhizae provide different benefits during different seasons, with some doing the heavy lifting early in the growing season, and others kicking in during the warmer drier months, and others providing benefits towards the end of the growing season or throughout the winter.

Preferred endomycorrhizae spores include *Glomus aggregatum, G. etunicatum, G. intraradices*, and *G. mosseae*. Other endomycorrhizae include *G. clarum, G. deserticola, G. clarum, G. deserticola, Gigaspora margarita* and *Paraglomus brasilianum*, Endomycorrhizae fungi spores are provided at 0.78 Propagules/g for each species used in the product. The endomycorrhizae are supplied in water-soluble or water-suspensible form, preferably powder.

When used in the product, the ectomycorrhizae spores *Rhizopogon amylpogon, R. fulvigleba, R. villosulus*, and *R. loteolus* spores are provided at 30.25 Propagules/g. *Scleroderma cepa* and *S. citrinum* ectomycorrhiza fungi spores are provided at 60.50 Propagules/g. *Pisolithus tinctorius* ectomycorrhiza fungi spores are provided at 2426.49 Propagules/g. *Lacarria laccata* and *R. rubescens* may suffice. The ectomycorrhizae are supplied in water-soluble or water-suspensible form, preferably powder.

Vitamins thiamine mononitrate ("B1"), nicotinamide ("B3") and pyridoxine HCl ("B6") are used to enhance plant growth and provide resistance to abiotic stress and pathogens including fungal and bacterial infections. They are supplied in water-soluble or water-suspensible form, preferably powder. In some embodiments vitamin B1 make take the form of thiamine HCl. Abiotic stress depletes B vitamins and B1 is an activator of disease resistance. Soluble sea kelp extract (*Ascophyllum nodosum*) provides improved plant development and root growth. It is another good source of micronutrients that are instantly available to the plants when applied. The sea kelp extract is supplied in water-soluble or water-suspensible form, preferably brown flake.

*Bacillus amyloliquefaciens* is a species of bacterium in the genus *Bacillus*. It synthesizes barnase, a natural antibiotic protein, and plantazolicin, an antibiotic with selective activity against *Bacillus anthracis*. It is used in agriculture, aquaculture, and hydroponics to fight root pathogens such as *Ralstonia solanacearum, Pythium, Rhizoctonia solani, Alternaria tenuissima* and *Fusarium* as well improve root tolerance to salt stress. *Bacillus amyloliquefaciens* is considered a growth-promoting rhizobacteria and have the ability to quickly colonize roots. *B. amyloliquefaciens* bacteria are provided at $1.1 \times 10^7$ CFU/g. The bacteria are supplied in water-soluble or water-suspensible form, preferably powder.

Sodium lauryl sulfoacetate is a surfactant providing emulsification, wetting, and foaming. Alternatively, sodium lauryl sulfate may be substituted. The surfactant is supplied in water-soluble or water-suspensible form, preferably powder.

The carrier is preferably maltodextrin, which is chemically inert relative to the plants, but is used as a horticultural insecticide both in the field and in greenhouses. After an insect comes into contact with maltodextrin solution, the solution dries and blocks the insects' spiracle, causing death by asphyxiation. Other carriers may suffice. The carrier is supplied in water-soluble or water-suspensible form, preferably powder.

An optional ingredient is chitosan, which is a plant growth enhancer and ecologically friendly bio-pesticide substance that boosts the innate ability of plants to defend themselves against fungal infections. The plant growth enhancer is supplied in water-soluble or water-suspensible form, preferably powder.

Organic or mineral humates are another optional ingredient in this suspension. Research to date shows that one of the constituents of humates blocks the plant enzyme that breaks down IAA and by extension other auxins such as IBA. For this reason, humates have not been used to date in combination with plant growth regulators such as auxins the humate component increases the effect of IBA because it is not being broken down in the plant as quickly due to the inhibition of the enzyme.

In a preferred embodiment, the horticultural product comprises a dry mixture of:

TABLE 1

| Ingredient | Form | wt % |
| --- | --- | --- |
| Indole-3-Butyric Acid | crystalline solid | 2.50% |
| Thiamine mononitrate (B1) | water-soluble powder | 0.25% |
| Pyridoxine HCL (B6) | water-soluble powder | 0.25% |
| Mycorrhizae | water-soluble powder | 2.64% |
| Sea Kelp Extract | brown flake | 1.06% |
| Bacillus Amyloliquefaciens | water-soluble powder | 0.88% |
| Sodium Lauryl Sulfoacetate | water-soluble powder | 0.07% |
| Maltodextrin | water-soluble powder | 92.35% |
| total | | 100.0% |

In another embodiment, the horticultural product comprises a dry mixture of:

TABLE 2

| Ingredient | Form | wt % |
| --- | --- | --- |
| Indole-3-Butyric Acid | crystalline solid | 2.00% |
| Thiamine mononitrate (B1) | water-soluble powder | 0.20% |

TABLE 2-continued

| Ingredient | Form | wt % |
| --- | --- | --- |
| Pyridoxine HCL (B6) | water-soluble powder | 0.20% |
| Mycorrhizae | water-soluble powder | 2.64% |
| Sea Kelp Extract | brown flake | 1.06% |
| Bacillus Amyloliquefaciens | water-soluble powder | 0.88% |
| Sodium Lauryl Sulfoacetate | water-soluble powder | 0.07% |
| Maltodextrin | water-soluble powder | 92.95% |
| total | | 100.0% |

Other embodiments of the dry vitamin-hormone horticultural product for promoting plant root growth set forth above may be made with the same products in slightly different but about the same wt %, where "about" is a range known to a person skilled in the art to be plus or minus 10% of the amount stated above.

Other embodiments of the product may also include nicotinamide ("B3") in the form of water-soluble powder up to about 1.0 wt %.

Combine the dry ingredients above and mix to form a water-suspensible dry mix. Add the dry mix to water in the desired proportions to create a suspension for treating plants. Examples are given below. Although the product is at least 95% soluble, adequate agitation of the liquid mixture during the application process must be maintained, as it forms a suspension. The IBA is partially dissolved, the amount depending on the dilution ratio, and the clay carrier for the mycorrhizae spores does not dissolve. The present product may be applied with other products such as nutrients and pesticides. Mix this product last. To combine this product with a nutrients solution, mix the nutrients first and then add this product at the recommended strengths. To combine with nutrients as a tank-mix, follow the nutrients manufacturer's directions for mixing, adding this product to the solution last.

The present product may also be used in deep root tree feeding, drenching, irrigation, chemigation, transplanting, as well as hydroseeding and hydro-mulching, which are planting processes that uses a slurry of seed and mulch ejected across large surface areas by high-power sprayers.

Example 1—Application to Non-Citrus Trees and Shrubs

Transplants and Installations.

Add 2 lbs of the horticultural product per 100 gallons (1 oz by volume per 1 gallon) of water. Apply the solution as a drench to the root ball at the time of planting prior to backfilling. Use 1 gallon of solution per each gallon of container or root ball size.

Deep Root Feeding/Injection Application for Established Tree Maintenance.

The arborist should choose the appropriate total volume (gallons) to be applied based upon their practices, injection equipment being used and DBH (diameter at breast height) of the tree. Add 1 tbsp of the horticultural product per 1" of DBH to the total liquid volume to be applied. For example, a 10" tree would get 10 tbsp (5 oz by volume) of this product. For established trees under stress, double the amount of this product as determined above.

Drench Application for Established Tree Maintenance.

Add 1 lb of the horticultural product per 100 gallons of water and apply 2 gallons of diluted mixture per 1" DBH. Evenly distribute the drench around and within the drip line of the tree. Ensure that the drench is absorbed into the soil and that there is no runoff. For established trees under stress, double the amount of this product as determined.

Example 2—Application to Citrus Trees

Orchard Plantings

Add 2-7 lbs of the horticultural product per 100 gallons of water, which is about 1-5 tbsp by volume per 1 gallon. Apply the solution as a drench to the root ball at the time of planting prior to backfilling. Use 1 gallon of solution per each gallon of container or root ball size. The drench may be reapplied every 45 to 90 days.

Container Planting and Repotting: Dry Mixing

Blend 3-8 oz of the horticultural product (¾ cup to 2 cups by volume) with 1 cubic foot of planting media, then follow standard potting practices. Water only enough to fully dampen the media with minimum drain through. Begin regular water practices after 3 days or when the top ¾" of the soil becomes dry.

Container Planting and Repotting: Drench Application

Add 0.5-4 oz of the horticultural product (2-16 tbsp by volume) per 1 gallon of water and apply 1 qt of solution per gallon of pot size. Prior to application, the potting media should be dry enough to absorb about ¼ its volume in water. Ensure the drench is absorbed into the media and that there is no drain through. Begin regular water practices after 3 days or when the top ¾" of the soil becomes dry.

Example 3—Application to Turf

Rate of Application: 1-4 oz (by weight) of the horticultural product per 1,000 sq ft in 1.5 to 2.0 gallons of water per 1,000 sq ft (65 to 90 GPA). Intervals: May be used every 14 to 30 days from emergence until dormancy.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the disclosure and equivalents thereof.

The invention claimed is:

1. A dry, vitamin-hormone horticultural product for promoting plant root growth comprising:
   a. one or more dry, water-suspensible plant growth regulators;
   b. mycorrhizae in the form of a water-soluble powder;
   c. vitamin B1 in the form of a water-soluble powder;
   d. vitamin B6 in the form of a water-soluble powder;
   e. sea kelp in the form of flakes or water-soluble powder;
   f. *Bacillus amyloliquefaciens* in the form of a water-soluble powder; and
   g. a carrier in the form of a water-soluble powder wherein the plant growth regulator is a solid crystalline form of indole-3-butyric acid or a solid crystalline form of a potassium salt of indole-3-butyric acid.

2. The horticultural product of claim 1 wherein the carrier is maltodextrin.

3. The horticultural product of claim 1 further comprising a surfactant in the form of a water-soluble powder.

4. The horticultural product of claim 1 further comprising chitosan.

5. The horticultural product of claim 1 further comprising organic or mineral humates.

6. A dry, vitamin-hormone horticultural product for promoting plant root growth comprising:
   a. about 2.50 wt % indole-3-butyric acid in crystalline solid form;
   b. about 0.25 wt % vitamin B1 in water-soluble powder form;
   c. about 0.25 wt % vitamin B6 in water-soluble powder form;
   d. about 2.64 wt % Mycorrhizae in water-soluble powder form;
   e. about 1.06 wt % sea kelp extract in brown flake form;
   f. about 0.88 wt % *Bacillus amyloliquefaciens* in water-soluble powder form;
   g. about 0.07 wt % sodium lauryl sulfoacetate in water-soluble powder form; and
   h. about 92.35 wt % maltodextrin in water-soluble powder form.

7. The horticultural product of claim 6 further comprising chitosan.

8. The horticultural product of claim 6 further comprising organic or mineral humates.

9. The horticultural product of claim 6 further comprising chitosan and organic or mineral humates.

10. The horticultural product of claim 6 wherein the indole-3-butyric acid is in salt form.

11. A dry, vitamin-hormone horticultural product for promoting plant root growth consisting of:
    a. 2.50 wt % indole-3-butyric acid in crystalline solid form;
    b. 0.25 wt % vitamin B1 in water-soluble powder form;
    c. 0.25 wt % vitamin B6 in water-soluble powder form;
    d. 2.64 wt % Mycorrhizae in water-soluble powder form;
    e. 1.06 wt % sea kelp extract in brown flake form;
    f. 0.88 wt % *Bacillus amyloliquefaciens* in water-soluble powder form;
    g. 0.07 wt % sodium lauryl sulfoacetate in water-soluble powder form; and
    h. 92.35 wt % maltodextrin in water-soluble powder form.

12. A dry, vitamin-hormone horticultural product for promoting plant root growth comprising:
    a. about 2.00 wt % indole-3-butyric acid in crystalline solid form;
    b. about 0.20 wt % vitamin B1 in water-soluble powder form;
    c. about 0.20 wt % vitamin B6 in water-soluble powder form;
    d. about 2.64 wt % Mycorrhizae in water-soluble powder form;
    e. about 1.06 wt % sea kelp extract in brown flake form;
    f. about 0.88 wt % *Bacillus amyloliquefaciens* in water-soluble powder form;
    g. about 0.07 wt % sodium lauryl sulfoacetate in water-soluble powder form; and
    h. about 92.35 wt % maltodextrin in water-soluble powder form.

13. The horticultural product of claim 12 further comprising chitosan.

14. The horticultural product of claim 12 further comprising organic or mineral humates.

15. The horticultural product of claim 12 further comprising chitosan and organic or mineral humates.

16. The horticultural product of claim 12 wherein the indole-3-butyric acid is in salt form.

\* \* \* \* \*